United States Patent [19]

Strom et al.

[11] Patent Number: 4,642,607

[45] Date of Patent: Feb. 10, 1987

[54] POWER LINE CARRIER COMMUNICATIONS SYSTEM TRANSFORMER BRIDGE

[75] Inventors: Stephen A. Strom; Kenneth W. Schnuelle; William E. Potwora, all of Tempe, Ariz.

[73] Assignee: National Semiconductor Corporation, Santa Clara, Calif.

[21] Appl. No.: 762,881

[22] Filed: Aug. 6, 1985

[51] Int. Cl.[4] .......................................... H04M 11/04
[52] U.S. Cl. ............................. 340/310 A; 340/825.5
[58] Field of Search ............ 340/310 R, 310 A, 825.5, 340/825.51; 375/3, 4

[56] References Cited

U.S. PATENT DOCUMENTS

| | | | |
|---|---|---|---|
| 3,962,547 | 6/1976 | Pattantyus-Abraham | 179/2.51 |
| 4,210,901 | 7/1980 | Whyte et al. | 340/310 R |
| 4,475,209 | 10/1984 | Udren | 375/4 |
| 4,491,946 | 1/1985 | Kryskow et al. | 340/825.5 |

Primary Examiner—John W. Caldwell, Sr.
Assistant Examiner—David A. Okonsky
Attorney, Agent, or Firm—Gail W. Woodward; Paul J. Winters

[57] ABSTRACT

A power line carrier communications system transformer bridge/repeater for receiving on a power line communications network a series of original message bit streams generated by a transmitting module and for relaying on the power line communications network corresponding relayed message bit streams to receiving modules. The transformer bridge/repeater includes coupling means adapted for connection to a power line communications network for receiving original message bit streams and for coupling relayed message bit streams onto a power line communications network. Processor means is connected to the coupling means and is responsive to certain predetermined ones of the original message bit streams for generating a corresponding relayed message bit stream.

4 Claims, 7 Drawing Figures

Microfiche Appendix Included
(1 Microfiche, 42 Pages)

POWER LINE CARRIER COMMUNICATIONS SYSTEM TRANSFORMER BRIDGE

BACKGROUND OF THE INVENTION

I. Field of the Invention

The present invention relates to power line carrier communications systems. More particularly, the present invention relates to a novel apparatus for transferring data in power line carrier communications systems.

II. Background Art

Power line communications systems have recently become a viable alternative as a communications link in many applications. Although various other data links such as optical, RF, ultrasonic and hardwire links have advantages in certain areas each one has limitations upon its applicability. For example, optical links operate only by line of sight, RF links are restricted by numerous regulations, ultrasonic links are interrupted by walls, and hardwired links require costly installation of signal carrying lines. With the power line carrier communication system as an alternative, pre-existing AC power lines may be utilized in the communications link.

In many applications such as building energy management schemes, power line communications systems enable the retrofitting of existing buildings to become a fairly simple task. By using the AC power line, no aftermarket installation is required for installation of remote control modules which control energy consuming devices such as compressors, motors, heating and air-conditioning and lighting. These remote control units and additional sensor units may communicate over the power line.

Utilization of the AC power line as a communications medium permits data to be transferred directly over the AC power line along with the normal AC current. The AC power line not only contains the typically 120 volt RMS of unwanted signal but also kilo-volt spikes which presents fundamental design challenges for carrier current transceiver circuits. In industrial environments, unwanted noise from motors, compressors and other industrial equipment generate even greater amounts of noise which may cause error in the data transmitted over the power lines.

In many applications the store input power is stepped down in voltage by a transformer to support lower voltage operating equipment. While certain other store equipment use the higher voltage input power, it is necessary to communicate between modules controlling equipment coupled to either power line. The step-down transformer does not permit low level signal communications of the power line carrier type to be transmitted between different voltage power lines. With data signals in the millivolt range and at a significantly higher frequency than the AC current, the transformer does not permit coupling of the signals from one side of the transformer to the other. In these situations, it is necessary to have a transformer bridge which permits coupling of the signal between the primary and secondary of the transformer while unaffecting the transformer voltage stepping-down characteristics.

The bridge module is utilized in addition to coupling data messages around the transformer, as a repeater to enhance data transfers between distant modules where normal signals face increased attenuation. With the bridge module operating as a repeater, the module may be used in systems where the input power supplies the same voltage power to all store equipment. The bridge module in application may also be used to provide communications between modules located on different phased lines of a multiple phased power line system.

It is therefore an object of the present invention to provide a novel and improved power line communication system transformer bridge capable of transferring data around a transformer.

It is yet another object of the present invention to provide a power line carrier communications repeater for enhanced reliability of network communications.

SUMMARY OF THE INVENTION

The present invention relates to a power line carrier communications system transformer bridge and repeater for receiving on a power line communications network a series of original message bit streams generated by transmitting module and for relaying on the power line communications network corresponding relayed message bit streams to receiving modules. The transformer bridge/repeater of the present invention permits coupling of messages transmitted on power lines on the primary side of a transformer to be coupled around the transformer to the power lines coupled to the secondary side of the transformer. In addition, the transformer bridge/repeater permits coupling of messages transmitted on one phase line of a multi-phased power system to be coupled to a receiving module located on a different phased line.

The transformer bridge/repeater includes coupling means adapted for connection to a power line communications network for receiving original message bit streams generated by a transmitting module and placed onto the network and for coupling corresponding relayed message bit streams generated by the transformer bridge/repeater onto the network. Processor means is connected to the coupling means and is responsive to certain predetermined ones of the original message bit streams so as to generate corresponding relayed message bit streams.

BRIEF DESCRIPTION OF THE DRAWINGS

The objects, advantages, and features of the present invention will be more fully apparent from the detailed description set forth below, taken in conjunction with the accompanying drawings in which like reference characters correspond throughout and wherein.

DETAILED DESCRIPTION OF THE PREFERRED EMBODIMENTS

Figure 1:
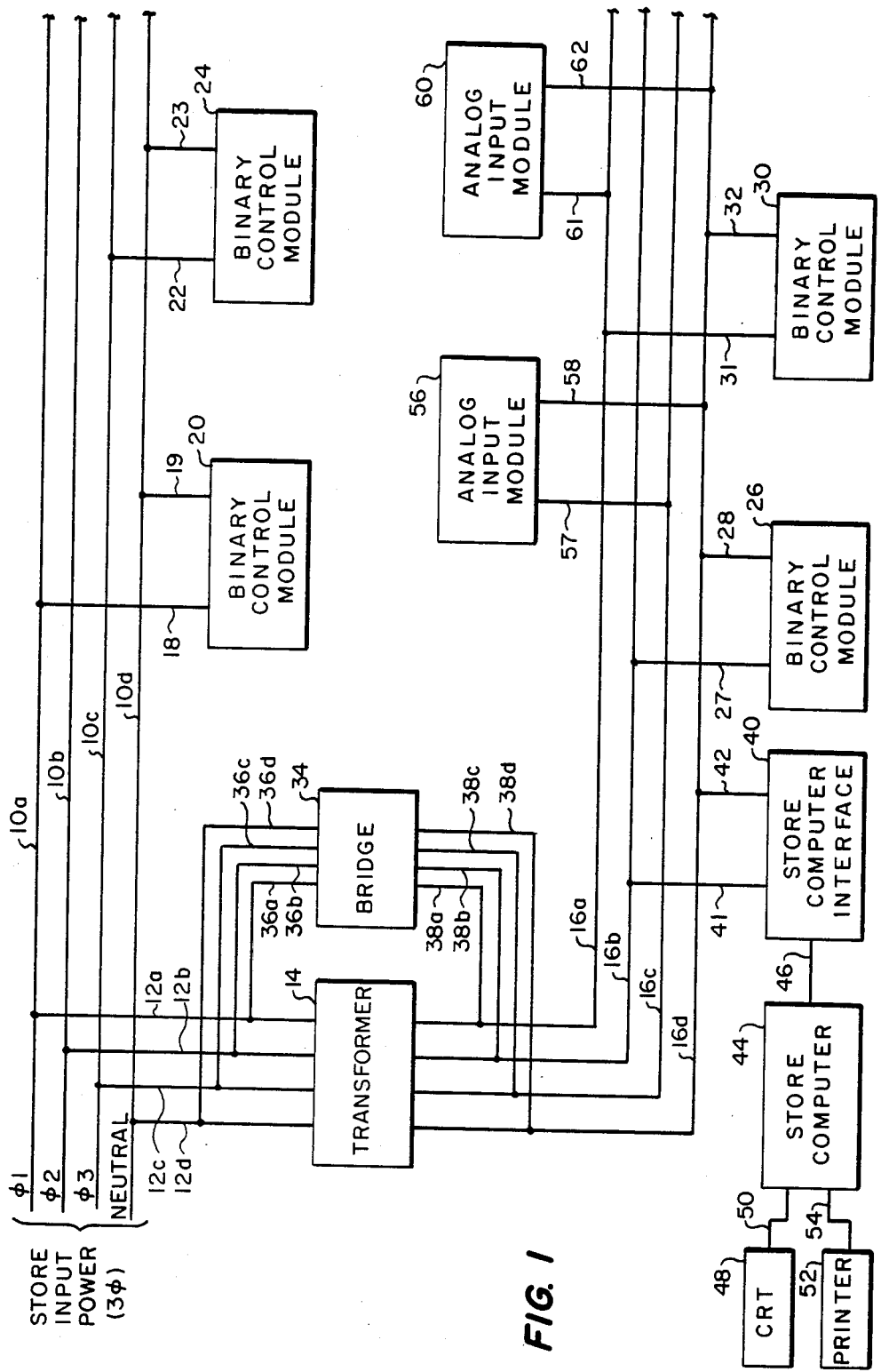
FIG. 1 is a schematical block diagram of a typical power line carrier communications system.

Referring to FIG. 1, store input power, an exemplary 480 volt/three phase power, is provided on lines 10a–10d (01–03 and neutral) and 12a–12d (01 –03 and neutral) to provide power to store equipment such as heating, ventilation, air-conditioning equipment (HVAC) and refrigeration equipment. The store input power is coupled by lines 12a–12d into transformer 14 which steps down the voltage of the input power. In the illustrated example, the stepped-down power provided on line 16a–16d would typically be 208 volt/three phase power. The 208 volt power may be used for lighting and various other store equipment. Respectively coupled to lines 10a and 10d by lines 18 and 19 is binary control module (BCM) 20. Similarly coupled to lines 10c and 10d by lines 22 and 23 is binary control module (BCM) 24. Binary control modules 20 and 24 use the power lines 10 and 16 as a communications network. Binary control modules 20 and 24 control the equipment drawing power from power line 10. Similarly, binary control module 26 is respectively coupled by lines 27 and 28 to power lines 16b and 16d. Similarly, binary control module 30 is respectively coupled by lines 31 and 32 to lines 16a and 16d. Binary control modules 26 and 30 communicate with each other and other modules on the power line network comprised of power lines 10a–d and 16a–d.

To provide communications coupling between different power voltage levels, i.e. around transformer 14, bridge 34 is provided. Bridge 34 couples around transformer 14 on lines 36a–36d and 38a –38d the data message provided by the individual modules. Bridge 34 also enables communication between modules located on differently phased power lines.

A store computer interface module 40 is respectively coupled by lines 41 and 42 to lines 16b and 16d. Store computer interface module 40 permits communication access by store computer 44 which is coupled to store computer interface module 40 by line 46. Store computer 44 may be utilized to download control parameters and provide data accessing for report generation of the energy management system status. Operator interface to store computer 44 is provided by CRT terminal 48 which is coupled by line 50 to store computer 44. In addition, printer 52 is coupled to store computer 44 by line 54 so as to provide hard copy reports on system status.

Analog input modules 56 is respectively coupled to lines 16c and 16d by line 57 and 58. Similarly, analog input modules 60 is respectively coupled to lines 16a and 16d by line 61 and 62. Analog input modules (AIM) 56 and 60 are coupled to analog sensors (not shown) such as temperature and dew point sensors. The analog input modules provide data to the binary control modules for computation of equipment control commands.

Figure 2:
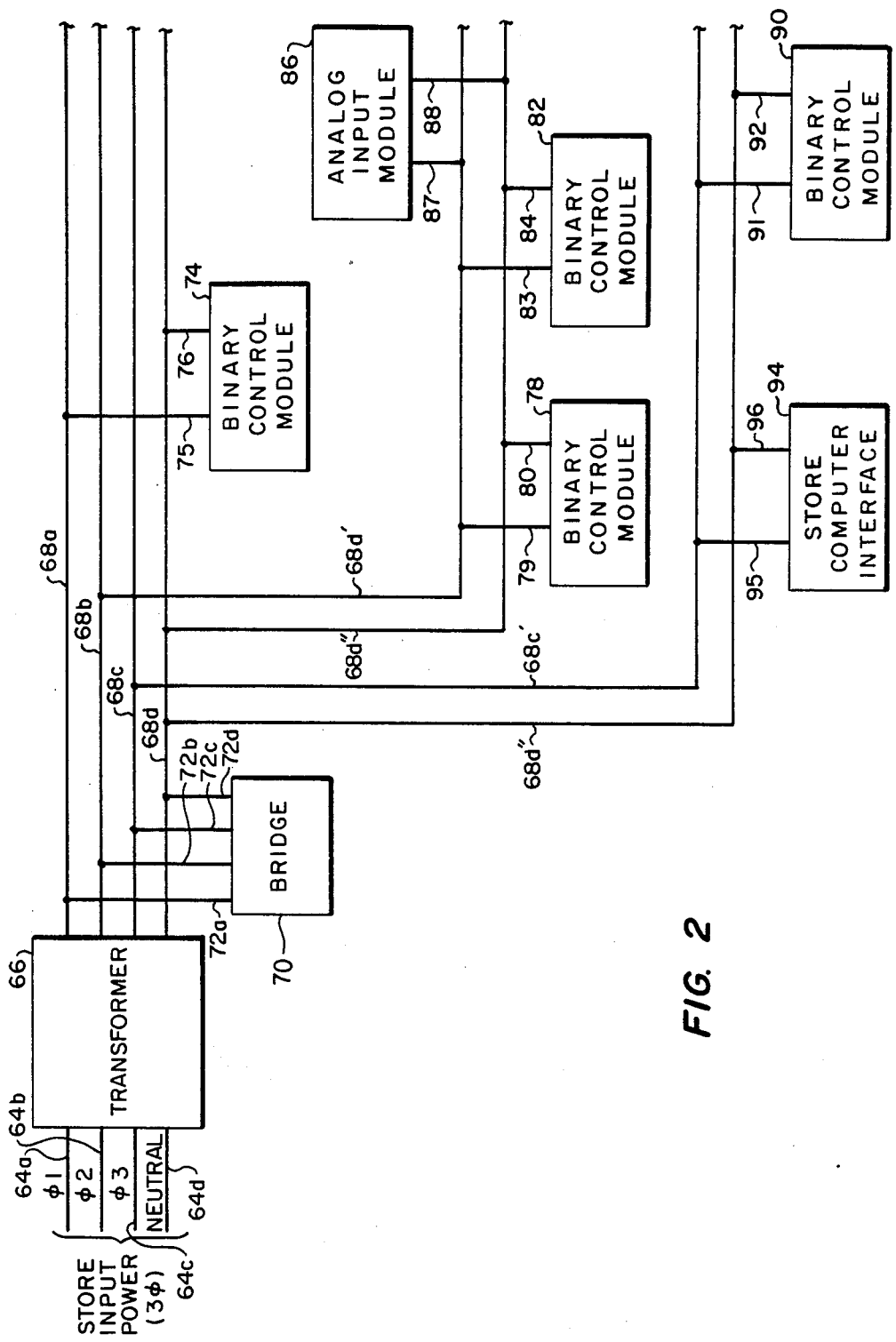
FIG. 2 is a schematical block diagram of an alternate embodiment of a power line carrier communications system.

Referring to FIG. 2, store input power, typically 480 volt/three phase power is provided on lines 64a–64d to step-down transformer 66. The power output from transformer 66 is typically 208 volts/three phase power provided on lines 68a–68d. Bridge 70 is respectively coupled by lines 72a–72d to power lines 68a–68d. Binary control module 74 is respectively coupled by lines 75 and 76 to power lines 68a and 68d. Binary control modules 78 and 82 are coupled to power lines 68b and 68d through power line branch 66b' and 68d'. Binary control module 78 is coupled by line 79 to line 68b' and line 80 to line 68d'. Binary control module 82 is also coupled by line 83 to line 68b' and by line 84 to line 68d'. Analog input module 86 is also coupled to phase two (02) power by lines 87 and 88 respectively coupled to line 68b' and 68d'.

Binary control module 90 and store computer interface 94 are coupled to phase 3 (03) power by power line branch 68c' and 68d'. Binary control module 90 is respectively coupled by lines 91 and 92 to lines 68c' and 68d''. Similarly, store computer interface 94 is respectively coupled by lines 95 and 96 to lines 68c' and 68d''.

Bridge 70 coupled by line 72a–72d enable the coupling of messages between modules and the store computer interface located on differently phased lines. Without the use of bridge 70, signals would be attenuated within the transformer and not passed between phased lines.

As illustrated in FIGS. 1 and 2, the energy management system consists of a variety of devices (BCM's, AIM's Bridge etc.) all linked together using the power lines as a communication network. During their normal operation, each BCM requires data from other modules on the network in oirder to perform their strategy functions. To facilitate network communications, a token passing protocol is implemented between the modules.

Using a token passing scheme, only one module at a time can initiate messages onto the network. That module, or master, issues a request or command to another module then waits for an acknowledgement. Additional messages cannot be sent until an acknowledgement has been received or a timeout occurs. The timeout is used to recover from cases in which the destination device is inoperative or the message data was lost due to noise conditions.

For cases in which a module cannot communicate reliably with another over the network, the bridge/repeater module is used. The bridge is located in a central location, typically near the transformer, and it is the bridge module that can always communicate directly with every other module on the network. Thus, if a BCM is having a problem sending/receiving messages to another module, it can relay the message through the bridge.

When the module has completed all its network requests, the master then passes the token to the next module on the network. Upon receiving the token, that module becomes the master and it can then initiate network activity.

To identify each of the devices, every module on the network is assigned a unique network station address. Each station address is set independently on every module using a set of hex switches and is loaded into the module RAM upon power-up or reset.

The energy management system uses a simple token passing bus access method to enable communications between the various elements of the system. The token passing scheme successively guarantees each potential master of exclusive control of the network.

The module currently in possession of the token, and hence in control of the network, is known as the master. Each binary control module (BCM) has a copy of the network map which contains the addresses of all potential masters in the network. However, all modules connected to the network are not necessarily capable of assuming network master status, such as the bridge or AIM modules.

The network protocol is premised on the theroy that all modules can reliably communicate with each other with occassional instances of lost messages due to transmission noise on the network. In order to insure integrity of the network, all messages, with the exception of broadcast messages, are acknowledged. Even token passes are acknowledged, for after a module passes the token to the next potential master, it then listens to the network for activity.

Initially, on power-up, the token does not exist. After successfully completing a self-test and initialization, each module "listens" to the network waiting for activity. If after a short period of time, there has been no network messages detected, then the module will create a token and permit itself to issue a request onto the network. In order to insure that two or more modules do not create tokens simultaneously, each module waits a different delay time before creating a token.

Due to the fact that it is possible for some modules not to see all of the network traffic, a minimum delay time is necessary to insure that tokens would not be inadvertently created. Within the minimum delay time, a module will have completed all of its own activity and passed the token on to the next module. Since all tokens are passed through the bridge, this is the one time in which all modules are guaranteed of seeing network activity.

Every potential master has a list of all modules that can accept the token. This list, known as the "Network Configuration Map" is downloaded from a store computer through the store interface module to every BCM on the network. Upon completion of its network activity, the current master locates the station address of the next BCM in its Network Configuration Map and then passes the token to that module. It does this by sending a "token" message to that module.

The token message, unlike most messages, follow a special routing on the network. Typically, the BCM would send the token to the bridge, storing the address of the destination BCM within the token message. The bridge would then acknowledge receiving the token by sending a "token ack" message back to the source module. Immediately following, the bridge would send the token to the specified destination. It then waits a predetermined period, approximately two message times, checking for activity. If there is some network activity, such as a BCM requesting data from an AIM, the token is assumed to have been successfully passed. If no activity is detected by the bridge, the bridge performs various retry attempts until the token has been passed.

The master or source BCM passes the token to the bridge, then waits a predetermined period, typically six message times, checking for activity. If there is activity, then the BCM assumes that the token has been successfully passed to the bridge. This activity is exemplified by the bridge acknowledging the token by sending a "token ack" message back to the source BCM. If not, the master BCM reattempts to pass the token to the bridge.

After sending the "token ack" message back to the source BCM, the bridge then passes the token on to the destination or target BCM. The bridge then waits a predetermined period, approximately two message times, checking for network activity. If there is activity, then the token is assumed to be passed to the target BCM. If no activity is detected by the bridge, on the first failure, the bridge attempts to pass the token to the target BCM again, under the assumption that noise corrupted the network message. The bridge then waits again, checking for network activity. If there is still no activity after two message delays, i.e. the second failure, the bridge attempts to send the token back to the source BCM. The bridge transmits a "token ack" message indicating that the destination BCM did not receive the token. The bridge then waits two message delays checking for activity, if there is no activity, from the source BCM or the destination BCM the bridge attempts to re-send the token back to the source BCM. The bridge transmits a "token nak" message indicating that the destination BCM did not receive the token. Once again, the bridge waits two message delays checking for activity from the source BCM or the destination BCM.

If no activity is detected, the bridge assumes that there is too much noise on the network to permit reliable communications and ceases its retry attempts. The bridge then lets the BCM timeout and create a new token.

In normal operation, the token is passed from the store computer interface module (SCI) to a BCM then back to the SCI. The SCI in turn then passes it to the next BCM in sequence and then returned to the SCI. This is done to permit the store computer the maximum possible access to the network.

All BCM's store in memory the history information to which modules the token was successfully passed. In the case where one module repetitively fails to accept the token, the BCM sets a flag to indicate an inoperative module. The BCM will then minimize the number of times a token is passed to the inoperative module. This is accomplished under program control by occasionally skipping the inoperative module in order to minimize delays in passing a token to an inoperative or "dead" module. In this particular scheme, the inoperative module is passed the token once every three times through the map. Once the module has accepted a token, the flag will be cleared, and token passing to that module will resume its normal operation.

In normal token passing, all tokens are passed through the bridge. If the module records three or more sequential failures in passing messages through the bridge, the source module will set a flag indicating that the bridge is inoperative. Once this happens, the source module will alternately attempt to pass the token first directly to the next BCM then through the bridge. In many cases the network will continue to function even if the bridge became inoperative.

Once accepting the token, the destination module now becomes the master or source module and issues requests across the network. Only one request can be sent at a time and all requests, with the exception of broadcast messages, are always acknowledged. If an acknowledgement is not received from the target module within a predetermined amount of time, the source module will retry the messsage.

If the request is sent directly to a destination module, the module waits a predetermined period of time, typically two message delays, before retrying the request. If the request was sent via the bridge, the module typically waits four message delays before retrying. In order to minimize the chance of not receiving any data from a target module, messages are retried several times, typically four times before considering the target module inoperative.

Broadcast messages are not acknowledged by any of the receiving target modules. However, broadcast messages do follow the same routing as normal messages. It is preferred that broadcast messages should be sent more than once in order to insure that all modules have received the data. When sending a broadcast, the source module waits the normal timeout delay before transmitting another message. This will give sufficient time for each of the receiving modules to process the message.

When using the bridge to relay messages to a target module, the source module first assumes that the bridge is operational. If the source module records three or more sequential failures, then a flag is set indicating a possible bridge failure. At this time, messages that are normally relayed through the bridge will be alternately sent direct to the target modules, then if that fails, through the bridge.

Figure 3:
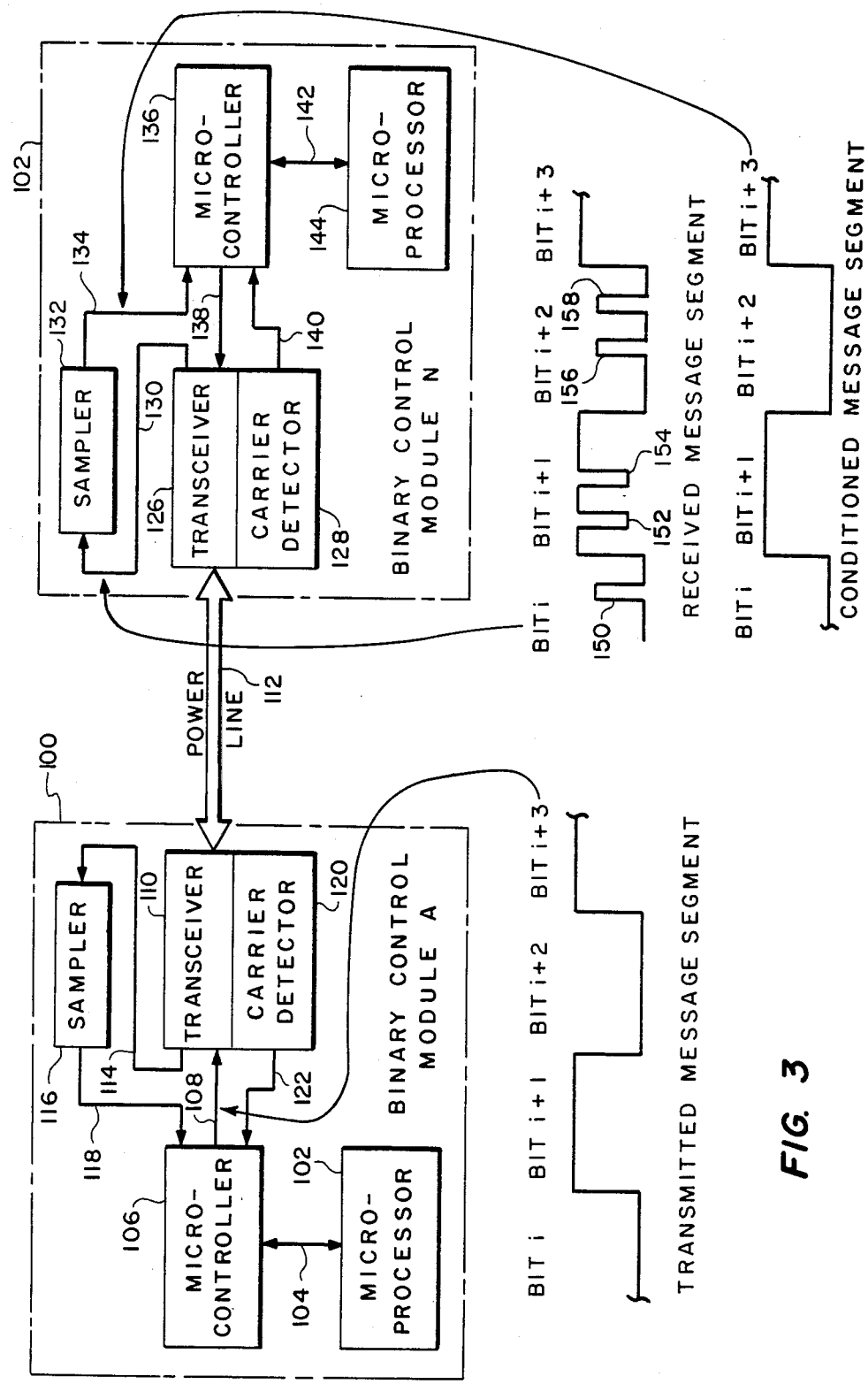
FIG. 3 is a schematical block diagram of an exemplary pair of control modules utilizing the power line carrier communications system of the present invention and associated waveforms.

FIG. 3 illustrates in block diagram for the communications portion of an exemplary pair of binary control modules (BCM's) 100 and 102. Although illustrated as BCM's the bridge module employs an identical signal conditioning format with a microcontroller also performing the function of the microprocessor. Module 100 includes a microprocessor 102 which transmits and receives data via line 104 to microcontroller 106. Data is formatted by microcontroller 106 for transmission on line 108 to transceiver 110. Transceiver 110 modulates the digital data into an analog signal for coupling over power line 112.

When receiving a message from module 102 the transceiver 100 converts the analog signal into digital form which is coupled over lines 114 to sampler 116. Sampler 116 provides a data signal on 118 to microcontroller 106. Carrier detector 120 is utilized in combination with tranceiver 110 to detect the presence of a valid carrier on the power line. The carrier detector is utilized in the system because of contention which is an inherent possibility in a multiple modular system. Upon detection of a valid carrier signal, carrier detector 120 provides an enabling signal on line 122 to microcontroller 106 for enabling the microcontroller to process the data received through the transceiver 110 via sampler 116.

Module 102 is similar to module 100 in that a transceiver 126 and carrier detector 128 are coupled to the power line. The output of the transceiver 126 is coupled by line 130 to sampler 132. The output of sample 132 is coupled by line 134 to microcontroller 136. Microcontroller 136 is also respectively coupled to transceiver 126 and carrier detector 128 by lines 138 and 140. Data is coupled between microcontroller 136 and microprocessor 144 via line 142.

In FIG. 3 an exemplary transmitted message segment is illustrated as being coupled on line 108 from microcontroller 106 to transceiver 110. In the transmitted message segment on line 108, bits i and i+2 are illustrated as being logic level "0" while bits i+1 and i+3 are logic level "1". When the transmitted message segment is coupled onto the power line 112, spurious noise induced on the power line by motors, compressors and other electrical equipment, may occur simultaneously with message transmission. This noise may cause errors in the data or rejection of the message as being invalid.

With module 100 transmitting a message, module 102 along with all other modules on the network will receive the message. A received message segment on line 130 of module 102 corresponds to the transmitted message segment on line 108 of module 100. The received message segment is characterized by spurious noise pulses during the bit periods. For example, during the period of bit i, noise pulse 150 occurs. Similarly, during bit i+1 noise pulses 152 and 154 are evident while during bit i+2 noise pulses 156 and 158 occur. The received message segment is conditioned by sampler 132, whose operation is described later, so as to provide a substantially noise-free message segment corresponding to the transmitted message segment. With the conditioned message segment input to microcontroller 136 from sampler 132, via line 134, the chances of microcontroller 136 interpreting the bit incorrectly are substantially reduced. Without sampler 132 being utilized, microcontroller 136 may sample the bit status during a noise pulse and erroneously intrepret the noise pulse as a valid logic state of the message data bit. Utilizing the sampler 132, received messages are conditioned so as to remove any such noise pulses from the bits, thereby eliminating an erroneous reading of data.

Figure 4:
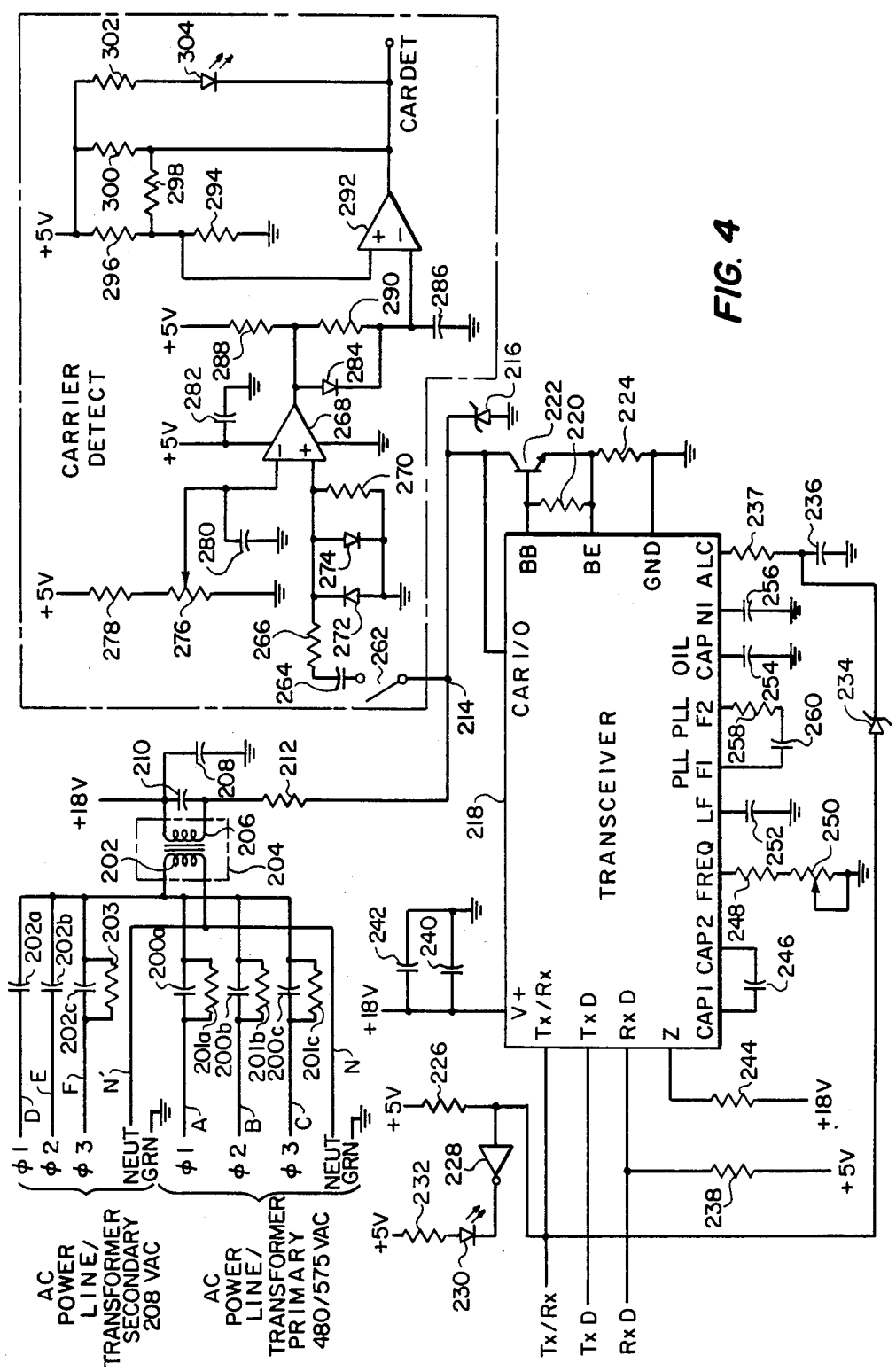
FIG. 4 is a schematical diagram of the power line carrier transceiver circuitry and carrier detect circuitry.

FIG. 4 illustrates the transceiver circuitry and carrier detect circuitry of the bridge module employed in FIG. 1. In FIG. 4, messages are transmitted on lines A, B, C and N of the input AC power line (transformer primary) where lines A, B, and C are separately phased lines with line N the common neutral line. Lines A, B and C are coupled through capacitors 200a–200c into winding 203 of transformer 204 to the neutral line N. Each capacitor 200a/4 200c isolates the input AC power line phases, A–C, from one another while permitting data transfer onto each differently phased power line. Resistors 201a–201c are respectively coupled in parallel across capacitors 200a–200c to provide a discharge path when the circuit is disconnected from the 480/575VAC power line.

Similarly, messages are transmitted on lines D, E, F and N' of the stepped down AC power line (transformer secondary) where lines D, E and F are separately phased lines with line N' the common neutral line. Line D, E and F are coupled through capacitors 202a–202c into winding 202 of transformer 204 to the neutral line N'. The neutral lines N and N' are electrically connected to provide a local common neutral bus between power systems. The neutral lines are common external to the bridge/repeater. Each capacitor 202a–202c isolates the stepped-down AC power line phases D–F from one another while permitting data transfer onto each differently phased power line. Resistor 203 is coupled in parallel across capacitor 202c to provide a capacitor discharge path when the circuit is disconnected from the 208 VAC power line.

Winding 206 of transformer 204 is inductively coupled to winding 202. One end of winding 206 is coupled to a positive 18 volt potential and through capacitor 208 to ground. Capacitor 210 is coupled between the ends of winding 206. Capacitor 210 and winding 206 form a tuned tank circuit which optimizes the reception of data while attenuating noise in the data message. The other end of winding 206 is coupled through resistor 212 to point 214. The transformer coupling circuitry described respectively couples the transmitted and received power line carrier signals to and from the power lines and module. It is envisioned that the module may also be coupled to a single three phase power line as illustrated in FIG. 2, with lines A, E, C and N along with capacitors 202a–202c and resistors 201a–c eliminated.

Point 214 is coupled to the cathode of zener diode 216 with the anode coupled to ground. Point 214 is also coupled to the carrier input/output terminal (CARI/O) of power line carrier transceiver 218. Transceiver 218 is typically a carrier current transceiver manufactured by National Semiconductor Corporation of Santa Clara, Calif., bearing part number LM1893. The operation of transceiver 218 is described in the publications "A New Carrier Current Transceiver I.C." by Mitchell Lee, IEEE Transactions on Consumer Electronics, Part 1, Volume CE-28, No. 3, August 1982; and "A Carrier Current Transceiver I.C. for Data Transmission over the AC Power Lines" by Dennis M. Miticelli and Michael E. Wright, IEEE Journal of Solid State Circuits, Volume SC-117, No. 6, December 1982.

Transceiver 218 converts a digital bit stream signal received at a transmit data input (TxD) into a frequency-shift keyed modulated analog signal output when a logic high or "1" signal is input to a transmit/receive select input (Tx/Rx). The Tx/Rx input is coupled to a positive 5 volt potential through resistor 226. The transmitted signal is output from transceiver 218 and coupled through a boost stage external to transceiver 218.

The boost stage includes resistor 220 which is coupled across the base and emitter of transistor 222 which has a base coupled to the transceiver boost base terminal (BB) and an emitter coupled to the transceiver boost emitter terminal (BE). The collector of transistor 222 is coupled to point 214. The emitter of transistor 222 is coupled through resistor 224 to ground.

When in the receiving mode, the Tx/Rx input is driven by a logic low or "0" signal. A carrier signal input from point 214 at the CARI/O input is provided as a serial frequency-shift keyed (FSK) bit stream. The transceiver converts the FSK data into digital or such that at a receive output (RxD) a corresponding serial digital bit stream is present.

A display circuit associated with transceiver 218 is used to indicate when the transceiver is in the transmit or receive mode. The display circuit is comprised of inverter 228 having an input coupled to the Tx/Rx input with its output coupled to the cathode of LED 230. The anode of LED 230 is coupled through pull-up resistor 232 to a positive 5 volt potential. When the Tx/Rx signal is high, transmit mode, LED 230 conducts providing illumination indicative of the transmit mode. The receive data (RxD) output is similarly coupled through pull-up resistor 238 to a positive 5 volt potential.

The Tx/Rx input is also connected to the anode of zener diode 234. The cathode of diode 234 is connected to capacitor 236 to ground and to resistor 237 to the ALC input of transceiver 218. This portion of the transceiver circuitry is used to control the automatic level control circuit of transceiver 218.

Power supplied to transceiver 218 is typically positive 18 volts and is provided to a V+ input. The V+ input is also coupled to ground through parallel connected capacitors 240 and 242. Transceiver 218 includes an internal 5.6 volt reference zener diode at a Z input which is connected to a positive 18 volt potential through resistor 244. Capacitor 246 is coupled across CAP 1 and CAP 2 inputs along with the FREQ input coupled to ground through series connected resistor 248 and potentiometer 250 which establish the carrier center frequency. A typical center frequency is 125 KHz. A limiter filter input (LF) is coupled through capacitor 252 to ground. Similarly, an offset hold capacitor input (OHCAP) and the noise integrator input (NI) are respectively coupled to ground through capacitors 254 and 256. A transceiver phase lock loop filter input (PLLF1) is coupled to a second phase lock loop filter input (PLLF2) through series connected resistor 258 and capacitor 260.

Carrier detect means are connected to point 214 through switch or jumper 262. A series connected capacitor 264 and resistor 266 couple through jumper 262 point 214 to the non-inverting input of comparator 268. The non-inverting input of comparator 268 is also coupled through resistor 270 to ground. Back to back diodes, diodes 272 and 274, are coupled between the non-inverting input of comparator 268 and ground so as to limit the signal amplitude into the carrier detect circuit when the transceiver is transmitting onto the power line receiving strong carrier signal, or large noise transients from the AC line. Series capacitor 264 and resistor 266 are included in the carrier detect circuit to prevent attenuation of the transceiver output when the transceiver is transmitting on the power line.

The inverting input of comparator 268 is coupled to the centertap of potentiometer 276. Potentiometer 276 is coupled between ground and one end of resistor 278. The other end of resistor 278 is coupled to a positive 5 volt potential. Capacitor 280 is coupled between the inverting input of comparator 278 and ground. The input power to comparator 268 is provided by a voltage input connected by a 5 volt potential with the voltage input also coupled through to capacitor 282 to ground. Comparator 268 is typically one-half of a LM383 dual comparator chip.

The output of comparator 268 is coupled to the anode of diode 284 with the cathode of diode 284 coupled through capacitor 286 to ground. The output of comparator 268 is also coupled through pull-up resistor 288 to a positive 5 volt potential. Coupled across the anode and cathode of diode 284 is resistor 290.

The junction of the cathode of diode 284, resistor 290 and capacitor 286 is coupled to the inverting input of comparator 292. Amplifier 292 is typically the other half of the LM383 dual comparator chip. The output of comparator 292 is coupled through a feedback network comprised of resistors 294, 296, 298 and 300 to the non-inverting input of comparator 292. A positive 5 volt potential is coupled to the feedback network. The positive 5 volt potential is coupled through current limiting resistor 302 to the anode of LED304 with the anode of LED304 coupled to the output of comparator 292. LED304 will illuminate when a carrier has been detected.

The basic operation of the carrier detector circuit is such that the signal received at the non-inverting input of comparator 268 is converted to a series of square wave pulses which are output to the rectifier network (diode 284, resistor 290) which then charges capacitor 286. A filtered DC voltage exists on capacitor 286 which is a function of the carrier amplitude at the non-inverting input of comparator 268 and the voltage threshold at the inverting input of compartor 268. When the voltage on capacitor 286 reaches the reference voltage established at the non-inverting input of comparator 292, the output voltage of comparator 292 changes state. Therefore, a logical "1" or "0" exists at the output of comparator 292 depending upon whether adequate carrier signal exists at the input of the comparator 268. Potentiometer 276 permits adjustment of the threshold of the comparator 268 so as to set the sensitivity of the input stage in detecting a carrier signal.

Figure 5:
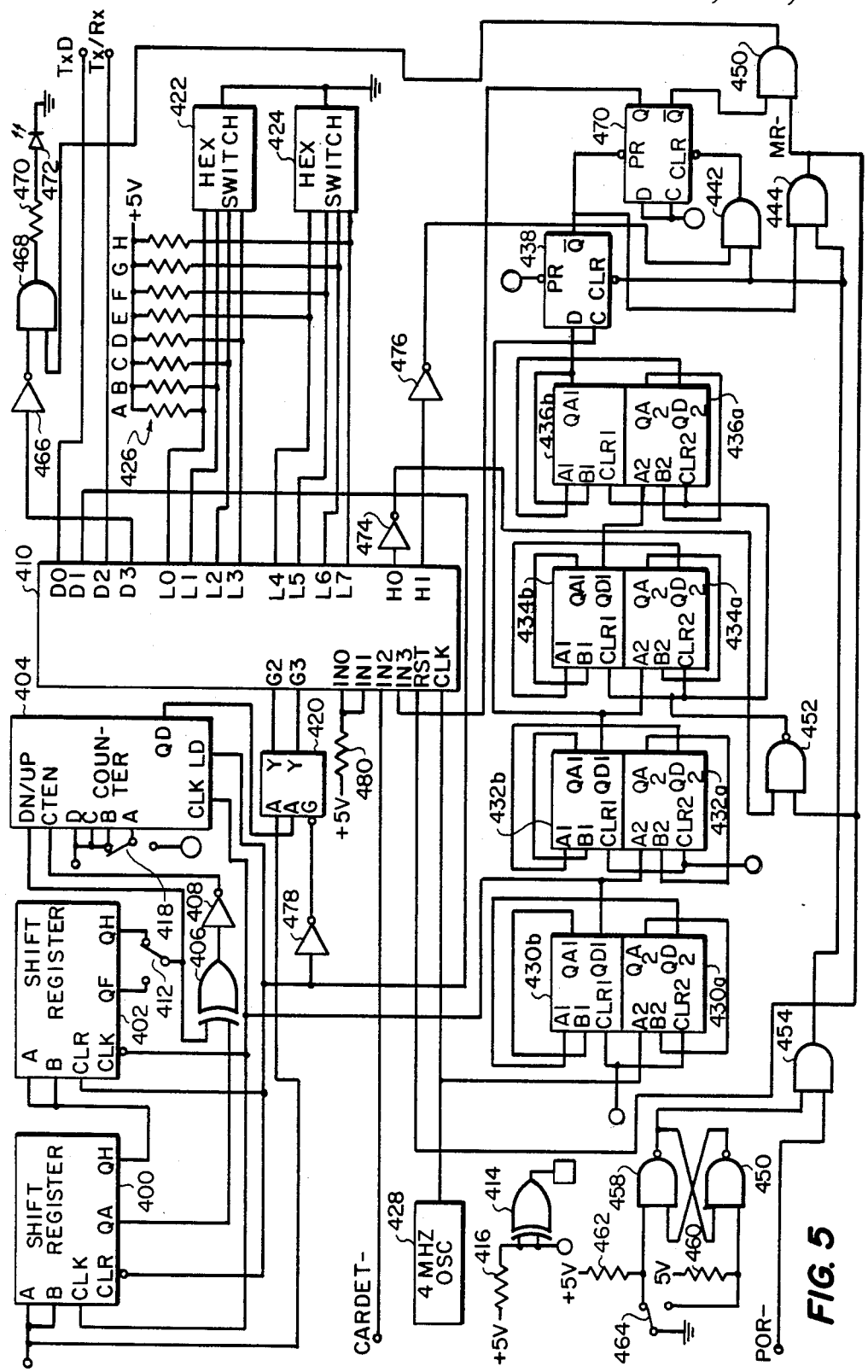
FIG. 5 is a schematical diagram of the data sampling circuitry and microcontroller circuitry.

FIG. 5 illustrates the bridge sampling means which samples data received by the transceiver from the power lines. Also illustrated in FIG. 5 is microcontroller means which formats data for transmission over the power line extracts data from a received formatted message and performs processing functions in the token and message communications protocol.

The sampling means comprises shift registers 400 and 402, counter 404 and logic gates 406 and 408. Shift registers 400 and 402 are 8-bit serial-in/parallel-out shift registers typically bearing part numbers 74HC164. Shift register 400 has a pair of signal inputs (A and B) coupled to the RxD output of transceiver 218 and a clock input (CLK) connected to receive a 40 KHz clock signal described later. The clear input (CLR) of shift register 400 is coupled to an output (D1) of microcontroller 410. An output (QA) of shift register 400 is coupled to an input of exclusive-or gate 406. Another output (QH) of shift register 400 is coupled to a pair of signal inputs (A and B) of shift register 402.

The clock input (CLK) of shift register 402 is connected to receive the 40 KHz clock signal. The clear input (CLR) of shift register 402 is also coupled to the (D1) output of microcontroller 410. A switch or jumper 412 permits the selective coupling of the output of shift register 402 (QF output or the QH output) to another input of gate 406. The output of gate 406 is coupled through inverter 408 to a count enable input (CTEN) of counter 404.

Counter 404 is a 4-bit binary up/down counter typically bearing part number 74HC191. The selected output of shift register 402 (QF or QH) is coupled to the down/up input (DN/UP) of counter 404. The clock input (CLK) of counter 404 is also connected to receive the 40 KHz clock signal while the load data input (LD) is coupled to the output (D1) of microcontroller 410. The data inputs of counter 404 (A, B, C and D) are held low by coupling to the output of exclusive-or gate 4145 which has a pair of inputs tied through pull-up resistor 416 to a positive 5 volt potential. Switch or jumper 418 selectively couples counter data input (A) to either the output of inverter 414 or the 5 volt potential through resistor 416. The output (QP) of counter 404 is coupled to input (A) of buffer 420 which has a corresponding output (Y1) to the input (G2) of microcontroller 410.

Microcontroller 410 is a single-chip microcontroller, for example, a microcontroller chip bearing part number COP440 manufactured by National Semiconductor Corporation. Microcontroller 410 has an internal arithmetic logic unit, program memory, input and output buffers, instruction decode/control logic along with an internal data bus. Microcontroller 410 has input ports L0–L7 connected to a pair of hex switches 422 and 424. Ports L0–L3 are connected to hex switch 422 with each connecting line respectively connected through a pull-up resistor 426a–426d to a positive 5 volt potential. Ports L4–L7 are connected to hex switch 424 with each connecting line respectively connected through pull-up resistors 426e–426n to a position 5 volt potential. Hex switches 422 and 426 permit the selective placing of either a logical "1" or "0" at a particular L input port for establishing the bridge station address. The position of hex switch 422 determines the four least significant bits of the 8-bit station address while hex switches 424 determines the four most significant bits. The L ports are coupled to an internal buffer register of microcontroller 410. The station address placed in the internal buffer register is coupled on an internal data bit to a RAM memory for use in recognizing by the microcontroller when the bridge is being addressed by a data message or token.

A 4 MHz clock signal is provided from oscillator 428 to the clock input (CLK1) of microcontroller 410 for processor timing. The 4 MHz clock signal is also coupled to the A input of one half of a dual 4-bit decade counter 420a. The most significant bit output (QD) of counter 430a is coupled to the input of the other half of the dual 4-bit decade counter 430b. The most significant bit output of counter 430b is coupled to the (CLK) inputs of registers 400 and 402 and counter 404. Counters 430a and 430b divide the 4 MHz clock signal down to a 40 KHz clock signal used in the sampling circuitry.

A dead man timer includes counters 432a, 423b, 434a, 434b, 436a and 436b. The counters are cascaded such that an input clock signal to the first stage, 430a is divided down by a factor of ten. An exemplary configuration has previously been described with reference to the 40 MHz clock signal provided through the sampling circuitry. The last counter 436b couples the (QA) output as a least significant bit such that there is no division by ten. A signal occurring every 2.5 seconds at the (QA) output of counter 436b (should there be no reset signal), described below, be applied to the dead man timer circuit. The output (QA) of counter 436b is coupled to the D input of D type flip-flop 438. The C input of flip-flop 438 is coupled to the QD output of counter 432b. The preset input (PR) of flip-flop 438 is coupled through pull-up resistor 416 to a positive 5 volt potential. The clear input (CLR) is coupled to the output of AND gate 454. The Q output of flip-flop 438 is coupled to the preset input (PR) of D type flip-flop 470. The D and C inputs of flip-flop 470 are coupled through resistor 416 to the 5 volt potential. The Q output of flip-flop 470 is coupled to the input IN3 of microcontroller 410. The Q not output of flip-flop 470 is coupled to an input of AND gate 450. The output of AND gate 450 is coupled to an input of gate 468. The clear input of flip-flop 470 is coupled to the output of the AND gate 442 which has one input coupled to the H1 output of microcontroler 410 through invertor 476, and another input coupled to the output of gate 454. AND gate 444 has an input coupled to the Q output of flip-flop 438 an another input coupled to the output of gate 454. The output of gate 444 is coupled to the input of NAND gate 452 and the reset input (RST) of microcontroller 410. The output of gate 444 is an MR- signal that is sued to reset the microcontroller.

Upon power of the module a power reset signal is provided from conventional circuitry (not shown) which provides a signal to gate 454 that is coupled through gate 444 to hold the MR signal in a logical blank state until the power has achieved a predetermined level determined by the comparator setting in the power reset circuitry. The power reset circuitry in combination with the reset logic ensures that the microcontroller is held in the reset condition until voltage levels of all logic elements have reached operational levela. A manual reset circuit comprised of switch 464, pull-up resistors 460 and 462 each tied to a 5 volt potential are coupled to the respective inputs of NAND gates 456 and 458. The outputs of AND gates 456 and 458 are respectively coupled to an input of the other. The outputs of NAND gates 456 and 458 are coupled to an input of AND gate 454. Upon switching switch 464 from one position to another a reset signal is applied through the manual reset circuitry, gate 454 and gate 444 to the reset input of microcontroller 410.

Microcontroller 410 has a series of general purpose outputs (D0–D3) with each output connected to an internal buffer register of microcontroller 110. The output (D0) is coupled to the TxD input of transceiver 218 so as to provide the formatted data, i.e., a serial bit stream, for transmission over the power line.

The output (D1) is coupled to the input of reset logic inverter which has an output coupled to the reset input (G) of buffer 420. The output D1 is also directly coupled to counter 404 load Data input (LD), and the clear inputs (CLR) of shift registers 400 and 402 for respectively resetting their operaton after the transmission of a formatted bit stream. The resetting of these components is to clear out any extraneous signals which may effect the validity for future data. The output (D2) is coupled to the Tx/Rx input of transceiver 218 with the state of the signal on this line enabling either the transmitting circuitry or the receiving circuitry of transceiver 218.

The output (D3) is coupled through inverter 466 to an input of gate 468. The output of gate 468 is connected through resistor 470 to the anode of LED 472. The cathode of LED 472 is coupled to the ground. LED 472 illuminates when the signal at output (D3) is low and the output from gate 450 is high. Output (D3) is set via the microcontroller 410 and the output from gate 450 is set on the condition that the dead man timer circuit did not expire and that the reset signal (MR-) is not active. The illumination of LED472 indicates that microcontroller 410 is operational, no dead man time-outs have occurred and that the module is OK.

Microprocessor 410 also uses two additional general purpose output ports (H0 and H1). The output (H0) is coupled through inverter 474 an input of gate 452 and is to reset the dead man timer circuit. The microcontroller 410 sends a pulse to the dead man timer every 100 milliseconds to keep the timer from expiring. This is used as an indication that the bridge is still operational. The output (H1) is coupled through inverter 176 to an input of gate 442 and is to reset the flag that indicates a dead man timeout has occurred.

The microcontroller uses four general purpose inputs (IN0-IN3). The input (IN0 and IN1) are always tied to a logic high or "1" by coupling to a positive 5 volt potential through pull-up resistor 480.

The carrier detect signal (CARDET-) provided from the carrier detect circuit is coupled to an input (IN2) of microcontroller 410. The carrier detect signal enables the microprocessor to begin processing a data stream received at the G3 input from the sampling circuit.

Figure 6:
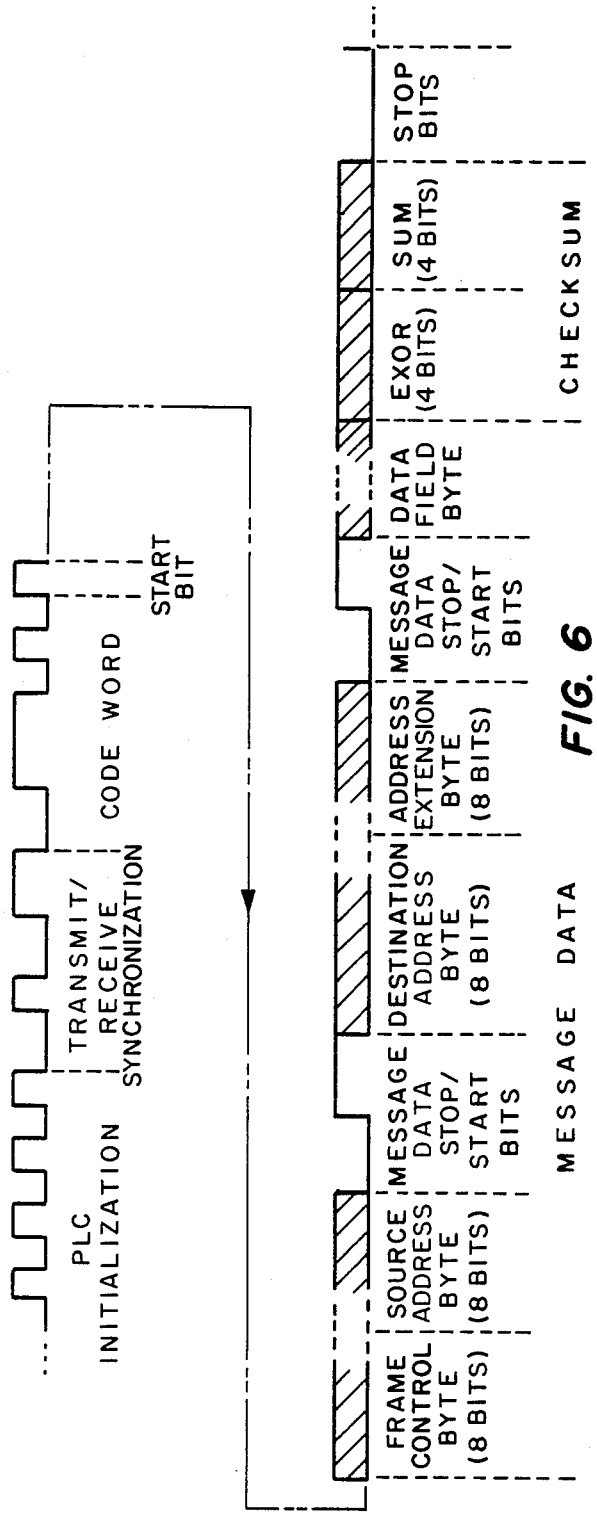
FIG. 6 is a graphical representation of the message format utilized in the present invention.

The formatted bit stream of FIG. 6 includes a three part preamble for synchronizing the receiving transceiver and for initial message error detection. The preamble consists of the PLC initialization period followed by the transmit/receive synchronization period which is then followed by a unique code word which was analytically selected to minimize chances detecting a synchronization error.

The first part of the preamble is the PLC initialization which consists of four cycles of alternating "1"'s and "0"'s. The PLC initialization sequence is utilized by a receiving transceiver. The automatic adjust function of the receiving transceiver requires one high and low transition to be received in order for the phase lock loop to lock onto the incoming carrier. Thus the PLC circuit can not guarantee it will output valid receive data on the first one and zero transition. However, during this time, the receiving unit is attempting to determine the start of a bit time. It does this by initializing its receive clocks when a transition occurs. Since the first transition is not guaranteed to be valid, there are three additional high-to-low transitions for the receiver to synchronize its clocks. Three transitions, instead of one, are provided to permit the receiver as many opportunities to synchronize on the incoming signal without causing a significant delay in transmission.

The second part of the preamble consists of a transmit/receive synchronization period. The transmitter sends two zeroes, followed by a one, followed by two zeroes, followed by two ones. This is used by the receiver to indicate that the PLC initialization sequence has completed. Since it is possible for the receiver to synchronize on more than one point within the initialization sequence, this portion of the preamble is designed such that the receiver can easily identify the end of initialization and prepare itself to check the succeeding code word. It does this by waiting for the first occurrence of two zeroes in the received bitstream. This can be easily differentiated from the alternating zero and one pattern in the first portion of the preamble. Just in case the first series of two zeroes are incorrectly received, the transmitter sends a second series of two zeroes. This provides two chances for the receiver to correctly identify the end of the initialization sequence.

The third part of the preamble consists of a code word unique to the power line communications message format that is used to verify that the receiving microcontroller has synchronized correctly with the incoming message. The code word consists of two "0"'s followed by three "1"'s which are then followed by a "0", a "1" and a "0". The receiving microcontroller upon verification of this sequence by the microcontrollers internal firmware determines that a valid message is to follow. Once the code word has been verified by the receiving microcontroller, the microcontroller will not re-synchronize the data portion of the message.

The microcontroller chip is made up of many functional blocks, these include the central processor unit (CPU), arithmetic logic unit (ALU), read only memory (ROM), random access memory (RAM), counter/timer unit and input and output circuits. All of those functional blocks are used during both the transmit and receive operations.

During a transmit, the entire message is first contructed in the microcontroller's internal RAM, the message is stored as a series of sequential bits. Once the message has been created, the microcontroller sets the Tx/Rx output (D2) to a logic one. This places the PLC transceiver into the transmit state. The microcontroller then sets the TxD output (D0) to the state of the first bit in the transmit message. The counter/timer is then set to interrupt the CPU once every bit time (1/2300 seconds). Whenever a counter/timer interrupt occurs, the microcontroller then transmits the next bit within the message.

During a receive, the microcontroller uses the RxD (G3) and CARDET- (IN2) inputs. When CARDET- makes a transition from a logic "1" to a logic "0", the microcontroller uses this as an indication that a message is being transmitted. It then checks the incoming data from the RxD input and waits for a high-to-low transition. This transition marks the start of a bit time. The microcontroller then delays the ½ bit time and then initializes the counter/timer to interrupt once every bit time (1/2300 seconds) from the center of the received bit. Then whenever, a counter/timer interrupt occurs, the microcontroller reads the state of the RxD input and saves the state of this bit in its RAM. By saving the bits sequentially the microcontroller builds the entire receive message in RAM. Once completed, a checksum is calculated and verified on the received message.

The code word is followed by message start bit which is comprised of a "1". Following the start bit is the message data. The message data is transmitted from the most significant byte to the least significant byte and within each byte from the most significant bit to the least significant bit.

A frame control byte directly follows the start bits and is an 8-bit field used to identify the message type such as a token, system broadcast message, module command, initial system data, module request or input/output command.

Following the frame control byte is a source control byte which is an 8-bit field that has the address of the module that initiated the message. This address is determined by hex switches set to a predetermined unique identifying address for each module. The source address byte identifies the module which originated the transmission. Following the source address byte is a message data stop/start bit which are a "1" followed by a "0".

Following the source address byte, message data stop/start bits are placed into the transmitted message data by the formatting microcontroller. The message data stop/start bits are used to verify synchronization on the incoming data by the receiving microcontroller. The message data stop/start bits are placed into the transmitted message at intervals of 16-bits.

The first occurrence of message data stop/start bits are followed by an 8-bit field designated as the destination address byte which contains the address of the module that is to receive the message. Following the destination address bit is an 8-bit field used when message data is sent through a bridge module. This address information is used by the bridge module to determine the ultimate destination. If this address matches the bridge address, then the destination is the bridge itself. If any other address is present the bridge will re-transmit the message to that specified module.

Following the address extension byte are message data stop/start bits which are typically a "1" followed by a "0". As before, the message data stop/start bits are used by the receiving microcontroller to verify the synchronization of the incoming data.

The second group of message data stop/start bits is followed by the data field. The data field may be either a single byte (8-bits) data field, as illustrated in FIG. 5, or a nine byte (72-bits) data field. When the data field is comprised of nine bytes, at 16-bit intervals message data stop/start bit are interposed as was previously described.

As illustrated in FIG. 6, the data field is a single data field byte which is followed by a checksum byte. The checksum byte is an 8-bit field containing two 4-bit check values. The first check value is a 4-bit exclusive-OR of the message data contents, exclusive of the message data stop/start bits, e.g., frame control byte, source address byte, destination address byte, address extension byte and data field byte. The second 4-bit check value is a 4-bit sum of the number of bits in the message data, exclusive of the message data stop/start bits, set to "1". A checksum byte is used to indicate that message data bits received are accurate with respect to the transmitted message data bits. The checksum bits are followed by stop bits which indicate the end of the message transmission. The stop bits are transmitted as two "0"'s.

When the receiving module carrier detect circuit detects a carrier signal it provides a signal CARDETto the receiving microcontroller. This signal enables the microcontroller to interrupt other concurrent processing and receive the message. Synchronization of the transceiver occurs during the PLC initialization period of the message as discussed previously. Synchronization of the receiving microcontroller is accomplished when a first high to low transition occurs during the transmit/receive synchronization period at this point the microcontroller initializes its receiving clock. After the occurrence of the high to low transition, the receiving microcontroller makes three additional readings on the state of the incoming data during the same bit time. If two out of three readings indicate that the data was still in the low state, then synchronization is confirmed. Should at least two of the three readings indicate that the data was not in the low state, for example the first high to low transition was caused by a noise spike, the receiving microcontroller does not synchronize its receive clock at this time. The receiving microcontroller will then wait again until the second high to low transition in the transmit/receive synchronization period.

By utilizing the multiple reading scheme, the effect of noise spikes on the validity of incoming data can be minimized. During the receipt of an incoming message, the receiving microcontroller may find it necessary to resynchronize on the incoming data. When this occurs, the microcontroller attempts to predict the position of the next rising edge.

The receiving microcontroller looks for the code word to verify that synchronization is correct with the incoming message. The microcontroller compares the receive code word with a programmed sequence of corresponding bits. Upon verification, the receiving microcontroller knows that a valid message is to follow. Once the code word has been verified, the receiving microcontroller will not resynchronize during the data portion of the message. Should the received code word contain an error that is detected by the microcontroller, the microcontroller is programmed to restart the receive sequence to detect the transmit/receive synchronization data.

Upon validation of the code word and correct synchronization, the microcontroller looks for a start bit which immediately follows the code word and indicate the beginning of message data.

Figure 7:
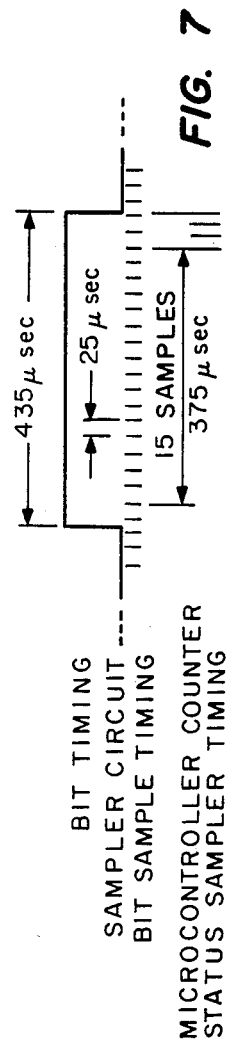
FIG. 7 is a graphical representation of the bit period sample timing.

The sampling circuit samples the received message bits and provides an output signal of a state corresponding to the predominant state of the bit during the bit period. The sampling circuit continuously samples the data bit with fifteen samples taken over a 375 microsecond period during a central portion of the 435 microsecond bit time (2300 baud) being used by the microcontroller to determine the bit state. FIG. 7 illustrates the sampling scheme which occurs during an exemplary bit period.

The sampling hardware is illustrated in FIG. 5 such that data is received on the RxD line is sampled at a 40 KHz clock rate and shifted at the same rate into shift registers 400 and 402. The 40 KHz oscillator may be synchronized with the 4 MHz oscillator although this is not a requirement. As data is passed through shift register 402 it is counted by the 4-bit counter 404. Counter 404 counts up during the sampling of a high bit, and as the bits are shifted through registers 400 and 402 during a following low bit, the counter counts down. With the jumpers 412 and 418 in the position illustrated in FIG. 4, counter 404 provides an output indication at the counter QD output (the most significant bit output of the 4-bit binary counter) of the state which appears most often in 8 out of the last 15 samples occurring during the central sampled portion of the bit period. Should eight or more samples during the bit period be high, then the QD output provides a high output as being the state of the bit. The QD output is sampled by the Microcontroller during the bit period after the 15 samples have been counted. Although illustrated as three samples being taken by the microcontroller during the bit period, one sample is sufficient. By changing jumpers 412 and 418 to the opposite position, the counter is preset to begin counting from 1 with a QD output high when 7 of 13 bit samples are high.

By utilizing the described sampling scheme the received data can be isolated from line noise that lasts up to 150 microseconds and which typically occurs every 8.3 milliseconds. By utilizing this sampling scheme to eliminate noise from an incoming signal, the microcontroller is able to spend less time decoding data so as to achieve an increased baud rates in data reception.

During the reception of the incoming message data portion of the message, no other processing is performed by the receiving microcontroller until the entire message has been received, except for the verification of the stop/start bits.

After the entire message has been received the microcontroller recalculates the checksum on the entire message and compares this calculation against the checksum data attached to the message. If the calculated checksum data matches the received checksum data then a valid message is assumed to have been received. The message data is then ready to be processed by the microcontroller. The microcontroller determines if the address in the destination address byte of the token or message is the station address of the bridge module. If so the bridge reformats the message for transmission to the target module. The reformatted message includes the data indicating the station address from the address extension byte of the received message. The address extension byte is transferred into the destination address byte of the message transmitted to the target module from the bridge. The reformatted message includes the bridge station address in the source address byte and the originating modules address in the address extension byte when the bridge transmits the message. The reformatted message contains the same information in the data field as the original message. Furthermore, the bridge calculates new checksum values.

The previous description of the preferred embodiments are provided to enable any person skilled in the art to make or use the present invention. Various modifications to these embodiments will be readily apparent to those skilled in the art, and the generic principals defined herein may be applied to other embodiments without the use of the inventive faculty. Thus, the present invention is not intended to be limited to the embodiment shown herein, but is to be accorded the widest scope consistent with the principal and novel features disclosed herein.

What is claimed is:

1. A powder line carrier communications system transformer bridge/repeater for receiving on a power line communications network a series of original message bit streams generated by a transmitting module and for relaying on said power line communications network corresponding relayed message bit streams to receiving modules, comprising:
   transceiver means connected to means for converting said relayed message bit streams from serial binary bit streams to frequency-shift keyed bit streams and for converting original message bit streams from frequency-shift keyed bit streams to serial binary bit streams;
   transformer means connected to said transceiver means for amplifying received original message bit streams provided to said transceiver means;
   isolation means connected to said transformer means and adapted for connection to a power line having a plurality of differently phased lines, said isolation means coupling said original message bit stream to said transformer means from said power line and coupling said relayed message bit streams from said transformer means to said power line; and
   processor means connected to said transceiver means and responsive to certain predetermined ones of said original message bit streams for generating corresponding relayed message bit streams.

2. The transformer bridge/repeater of claim 1 further comprising carrier detect means connected to said transformer means and said processor means, and responsive to each original message bit stream for providing a carrier detect signal wherein said carrier detect signal enables said processor means so as to generate said relayed message bit stream.

3. The transformer bridge/repeater of claim 2 further comprising sampling means connected between said transceiver means and said processor means for multiple sampling of the state of each bit in each original message bit stream and providing a conditioned input message bit stream wherein each bit in said conditional input message bit stream corresponds to the predominant sample state of each bit in said original message bit stream.

4. The transformer bridge/repeater of claim 3 further comprising station address means coupled to said processor means for providing a predetermined station address signal wherein said processor means compares said predetermined station address signal with a portion of each original message bit stream so as to determine said certain predetermined ones of said original message bit streams.

* * * * *